(12) United States Patent
Lewis

(10) Patent No.: US 10,502,066 B2
(45) Date of Patent: Dec. 10, 2019

(54) TURBINE ENGINE COMPONENT INCLUDING AN AXIALLY ALIGNED SKIN CORE PASSAGE INTERRUPTED BY A PEDESTAL

(71) Applicant: United Technologies Corporation, Hartford, CT (US)

(72) Inventor: Scott D. Lewis, Vernon, CT (US)

(73) Assignee: United Technologies Corporation, Farmington, CT (US)

( * ) Notice: Subject to any disclaimer, the term of this patent is extended or adjusted under 35 U.S.C. 154(b) by 852 days.

(21) Appl. No.: 14/707,118

(22) Filed: May 8, 2015

(65) Prior Publication Data

US 2016/0326885 A1 Nov. 10, 2016

(51) Int. Cl.
| | | |
|---|---|---|
| *F01D 1/00* | (2006.01) | |
| *F01D 5/18* | (2006.01) | |
| *F01D 5/14* | (2006.01) | |
| *F01D 9/04* | (2006.01) | |
| *F01D 11/08* | (2006.01) | |
| *F01D 25/12* | (2006.01) | |

(Continued)

(52) U.S. Cl.
CPC ............. *F01D 5/187* (2013.01); *F01D 5/147* (2013.01); *F01D 9/041* (2013.01); *F01D 11/08* (2013.01); *F01D 25/12* (2013.01); *F02C 3/04* (2013.01); *F02C 7/18* (2013.01); *F23R 3/002* (2013.01); *F05D 2220/32* (2013.01); *F05D 2240/127* (2013.01); *F05D 2240/30* (2013.01); *F05D 2240/35* (2013.01); *F05D 2260/202* (2013.01); *F05D 2260/2212* (2013.01); *F05D 2260/2214* (2013.01); *Y02T 50/673* (2013.01); *Y02T 50/676* (2013.01)

(58) Field of Classification Search
CPC . F01D 5/18; F01D 5/186; F01D 5/187; F01D 5/183; F01D 5/20; F01D 11/08; F05D 2260/201
See application file for complete search history.

(56) References Cited

U.S. PATENT DOCUMENTS 2,879,028 A    3/1959 Stalker
2,956,773 A *  10/1960 French ............... F01D 5/18
                                              416/90 R (Continued)

FOREIGN PATENT DOCUMENTS

DE    69602513    12/1999
DE    60211066    11/2006

(Continued)

OTHER PUBLICATIONS

European Search Report for Application No. 16168779.3 dated Nov. 10, 2016.

(Continued)

*Primary Examiner* — Craig Kim
*Assistant Examiner* — Edwin Kang
(74) *Attorney, Agent, or Firm* — Carlson, Gaskey & Olds, P.C.

(57) ABSTRACT

A component for a turbine engine includes a fore edge connected to an aft edge via a first surface and a second surface. Multiple cooling passages are defined within the turbine engine component. A skin core passage is defined immediately adjacent the first surface, and at least one pedestal interrupts a flow path through the skin core passage.

15 Claims, 6 Drawing Sheets

(51) Int. Cl.
*F02C 3/04* (2006.01)
*F02C 7/18* (2006.01)
*F23R 3/00* (2006.01)

(56) References Cited

U.S. PATENT DOCUMENTS

| | | | |
|---|---|---|---|
| 3,540,810 A | 11/1970 | Kercher | |
| 3,574,481 A | 4/1971 | Pyne, Jr. et al. | |
| 4,236,870 A | 12/1980 | Hucul, Jr. et al. | |
| 5,232,343 A * | 8/1993 | Butts | F01D 5/187 |
| | | | 415/115 |
| 5,243,759 A | 9/1993 | Brown et al. | |
| 5,704,763 A * | 1/1998 | Lee | F01D 5/188 |
| | | | 415/115 |
| 6,328,531 B1 | 12/2001 | Bariaud et al. | |
| 6,913,064 B2 | 7/2005 | Beals et al. | |
| 7,097,425 B2 | 8/2006 | Cunha et al. | |
| 7,556,476 B1 | 7/2009 | Liang | |
| 7,837,441 B2 | 11/2010 | Spangler et al. | |
| 8,398,370 B1 | 3/2013 | Liang | |
| 8,596,963 B1 * | 12/2013 | Liang | F01D 11/12 |
| | | | 29/889.22 |
| 2002/0021966 A1 * | 2/2002 | Kvasnak | F01D 5/187 |
| | | | 416/97 R |
| 2003/0059305 A1 | 3/2003 | Bather et al. | |
| 2003/0129054 A1 * | 7/2003 | Manning | F01D 5/187 |
| | | | 415/115 |
| 2005/0118882 A1 | 6/2005 | Chiang et al. | |
| 2005/0281667 A1 | 12/2005 | Liang | |
| 2006/0093480 A1 | 5/2006 | Cunha et al. | |
| 2008/0063524 A1 * | 3/2008 | Tibbott | F01D 5/187 |
| | | | 416/95 |
| 2008/0273963 A1 | 11/2008 | Spangler et al. | |
| 2009/0324385 A1 | 12/2009 | Liang | |
| 2010/0129195 A1 * | 5/2010 | Surace | B22C 7/02 |
| | | | 415/115 |
| 2013/0243575 A1 | 9/2013 | Zelesky et al. | |
| 2014/0127013 A1 | 5/2014 | Spangler et al. | |
| 2014/0271129 A1 | 9/2014 | Mueller et al. | |

FOREIGN PATENT DOCUMENTS

| | | |
|---|---|---|
| EP | 0154893 | 9/1985 |
| EP | 0742347 | 11/1996 |
| EP | 1091092 | 4/2001 |
| EP | 1783327 | 5/2007 |
| EP | 1790822 | 5/2007 |
| EP | 1953343 | 8/2008 |
| EP | 2193859 | 6/2010 |
| EP | 2546007 | 1/2013 |
| SU | 1815334 | 11/1975 |
| WO | 0100964 | 1/2001 |
| WO | 2015006026 | 1/2015 |
| WO | 2015061117 | 4/2015 |
| WO | 2015065718 | 5/2015 |

OTHER PUBLICATIONS

European Search Report for Application No. 16168748.8 dated Sep. 29, 2016.

English translation of Notice of Opposition of European Patent Application No. 16168779.3 dated Jan. 23, 2019.

English translation of Notice of Opposition of European Patent Application No. 16168779.3 dated Jan. 22, 2019.

* cited by examiner

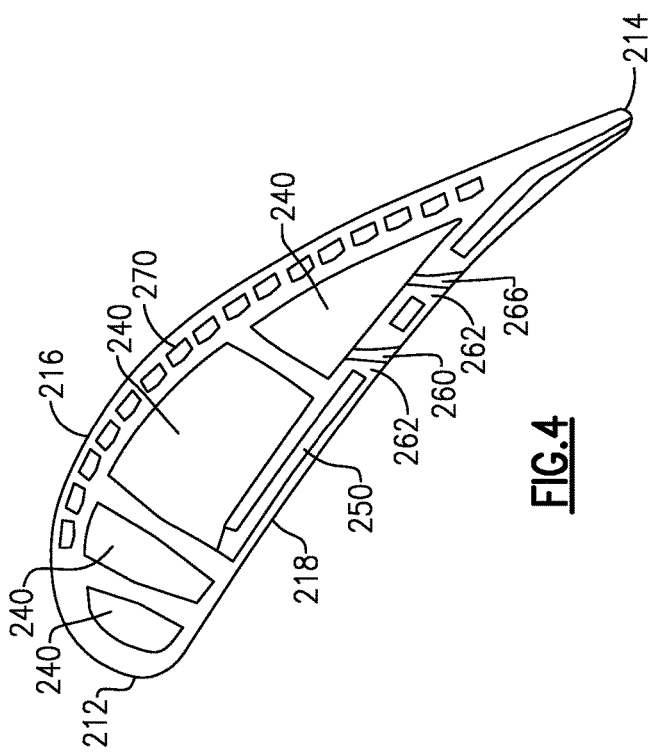
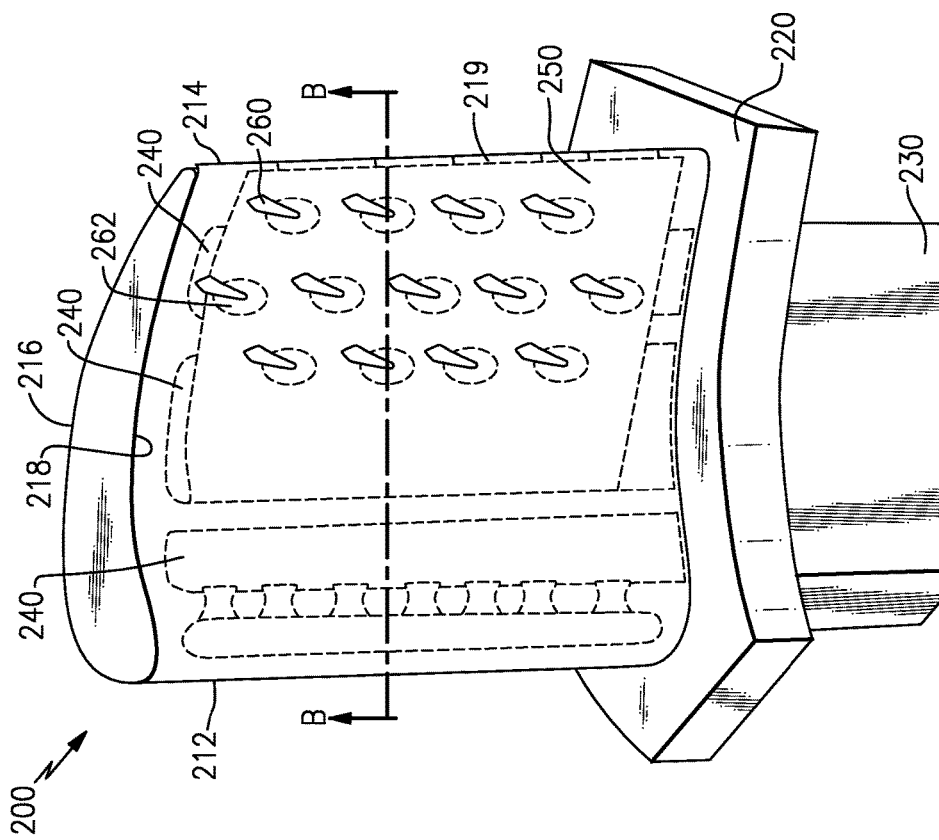

TURBINE ENGINE COMPONENT
INCLUDING AN AXIALLY ALIGNED SKIN
CORE PASSAGE INTERRUPTED BY A
PEDESTAL

STATEMENT REGARDING FEDERALLY
SPONSORED RESEARCH OR DEVELOPMENT

This invention was made with government support under contract number FA8650-09-D-2923-0021 awarded by the United States Air Force. The government has certain rights in the invention.

TECHNICAL FIELD

The present disclosure relates generally to turbine engine components, such as blades and vanes, and more specifically to a turbine engine component including an axially aligned skin core cooling passage interrupted by at least one pedestal.

BACKGROUND

Gas turbine engines, such as those utilized in commercial and military aircraft, utilize a compressor section to draw air into a flow path, a combustor section to mix compressed air with a fuel and ignite the mixture, and a turbine section to expand the resultant combustion products. The expansion of the resultant combustion products drives the turbine section to rotate, which in turn drives the compressor section to rotate.

As a result of the exposure to combustion products, components within the turbine section are subject to extreme heat. To prevent heat related fatigue and damage, the turbine components are actively cooled via internal cooling flow paths. Frequently air, or another coolant, is expelled from the internal cooling passages along the surface of the turbine engine component to create a film cooling effect on the exterior surface of the turbine engine component.

SUMMARY OF THE INVENTION

In one exemplary embodiment a turbine engine component includes a fore edge connected to an aft edge via a first surface and a second surface, a plurality of cooling passages defined within the turbine engine component, a skin core passage defined immediately adjacent the first surface, and at least one pedestal interrupting a flow path through the skin core passage.

In another exemplary embodiment of the above described turbine engine component, the at least one pedestal includes a plurality of pedestals distributed through the skin core passage.

In another exemplary embodiment of any of the above described turbine engine components, at least one pedestal in the plurality of pedestals includes a film cooling hole defined at least partially within the pedestal, the film cooling hole connecting one of the plurality of cooling passages to the first surface.

In another exemplary embodiment of any of the above described turbine engine components, the at least one pedestal has an oblong cross section relative to a turbine engine including the turbine engine component.

In another exemplary embodiment of any of the above described turbine engine components, each of the oblong cross sections includes a longest diameter, and the longest diameter is aligned with an axis of the turbine engine.

In another exemplary embodiment of any of the above described turbine engine components, each of the oblong cross sections includes a longest diameter, and the longest diameter is aligned with a radius of the turbine engine.

In another exemplary embodiment of any of the above described turbine engine components, each of the pedestals has a cross section along a direction of flow through the skin core passage, the cross section being one of an oval, a triangle, a rhombus, an airfoil, and a circle.

In another exemplary embodiment of any of the above described turbine engine components, at least 80% of a coolant entering the skin core passage exits the skin core passage at the aft edge.

In another exemplary embodiment of any of the above described turbine engine components, the skin core passage defines an axial coolant flow path.

In another exemplary embodiment of any of the above described turbine engine components, the film cooling hole connects a first cooling air flow path internal to the turbine engine component to the first surface, and wherein the skin core passage receives cooling air from a second cooling air flow path internal to the turbine engine component, and wherein the second cooling air flow path is a low pressure cooling air flow path relative to the first cooling air flow path.

In another exemplary embodiment of any of the above described turbine engine components, the one of the plurality of cooling passages connected to the first surface via the cooling hole has a higher cooling air pressure than a cooling air pressure of the skin core passage.

In another exemplary embodiment of any of the above described turbine engine components, the turbine engine component is one of a blade outer air seal, a combustor liner, a blade, and a vane.

In another exemplary embodiment of any of the above described turbine engine components, the blade is a blade in a second or later turbine stage.

In one exemplary embodiment a gas turbine engine includes a compressor section, a combustor section fluidly connected to the compressor section by a flowpath, a turbine section fluidly connected to the combustor section by the flowpath, at least one gas turbine engine component exposed to a fluid passing through the flowpath. The at least one gas turbine engine component includes a first surface and a second surface, at least one cooling passage defined within the turbine engine component, a skin core passage defined immediately adjacent the first surface, and at least one pedestal interrupting a flow path through the skin core passage, the at least one pedestal connecting an interior surface of the at least one cooling passage to the first surface.

Another exemplary embodiment of the above described gas turbine engine further includes a film cooling hole defined within the at least one pedestal, the film cooling hole providing a flow path between the at least one cooling passage to the first surface.

In another exemplary embodiment of any of the above described gas turbine engines, the at least one cooling passage includes a first cooling passage and a second cooling passage, and the at least one pedestal connects an interior surface of the first cooling passage to the first surface.

In another exemplary embodiment of any of the above described gas turbine engines, the first cooling passage receives cooling air from a first source, the second cooling passage receives cooling air from a second source, and wherein the skin core passage receives cooling air from the second cooling passage.

In another exemplary embodiment of any of the above described gas turbine engines, the first cooling passage receives cooling air from a first source, the second cooling passage receives cooling air from the first cooling passage, and the skin core passage receives cooling air from the second cooling passage.

An exemplary method for cooling a gas turbine engine component includes passing a cooling flow along a surface of the gas turbine engine component through a skin core passage, and providing a cooling film along the surface through at least one cooling hole, the at least one cooling hole passing through a pedestal interrupting cooling flow through the skin core passage.

Another example of the above described exemplary method for cooling a gas turbine engine component includes providing a cooling film along the surface through the at least one cooling hole includes receiving air at a first end of the cooling hole from a cooling passage internal to the gas turbine engine component and passing the air to a second end of the cooling hole at an exterior surface of the gas turbine engine component.

These and other features of the present invention can be best understood from the following specification and drawings, the following of which is a brief description.

BRIEF DESCRIPTION OF THE DRAWINGS

FIG. 3 schematically illustrates an isometric view of a second example turbine engine component, including hidden elements.

FIG. 4 schematically illustrates a cross section of the second example turbine engine component of FIG. 3.

DETAILED DESCRIPTION OF AN EMBODIMENT

Figure 1:
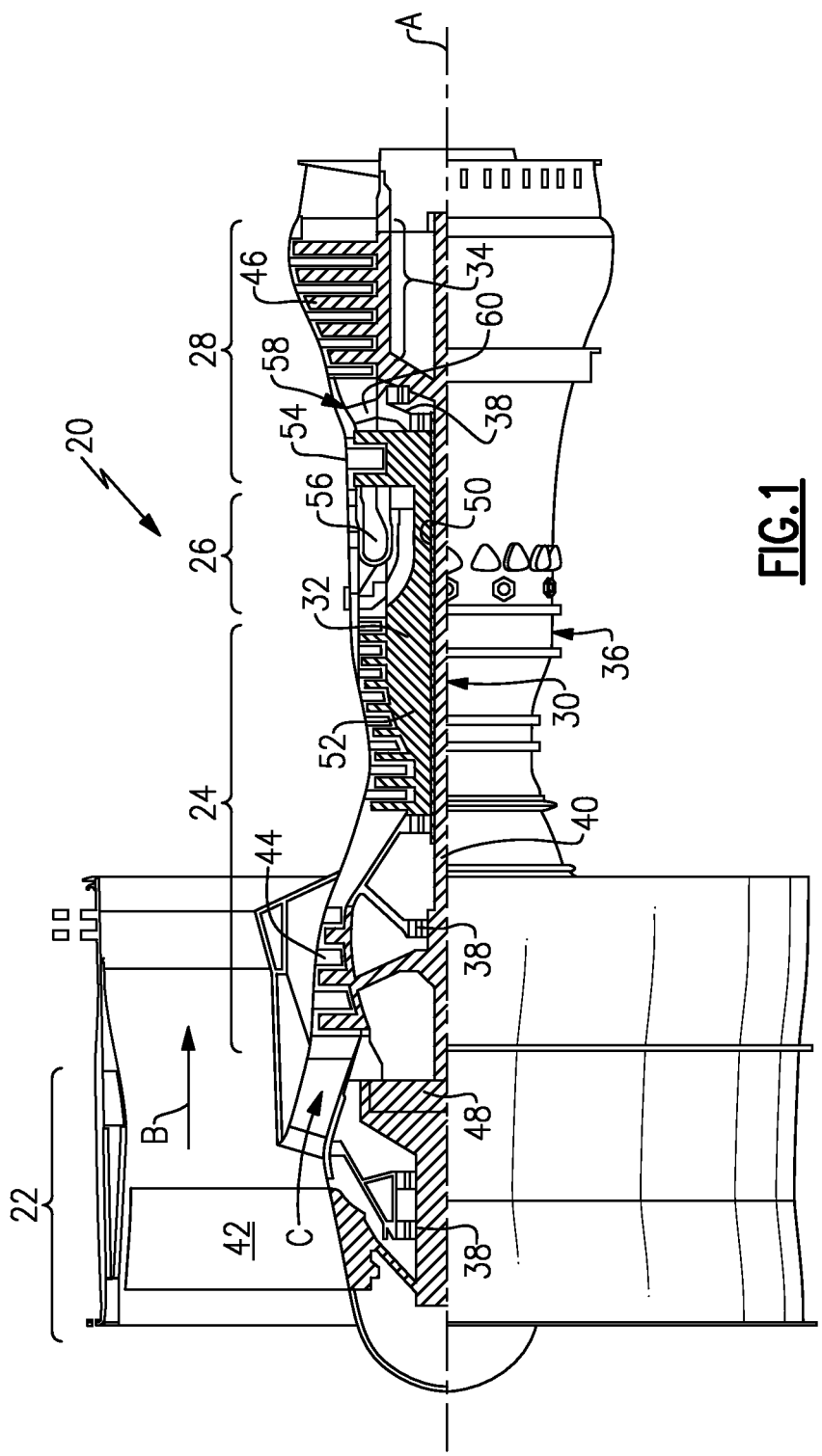
FIG. 1 schematically illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second.

Multiple components within the turbine section 28 include internal cooling passages for active cooling. Cooling air is typically drawn from the compressor section 24, such as via a compressor bleed, and provided to the cooled turbine component. Turbine engine components exposed to the hottest temperatures, such as turbine vanes in the first stage aft of the combustor section 26, are allocated the highest amount of cooling air (referred to as the cooling air budget). Later stages of vanes, blade outer air seals, and other turbine engine components that are further downstream are provided a limited cooling air budget, relative to the cooling air budget of the first stage vane.

While film cooling is frequently employed as a cooling method, film cooling produces a significant drop in coolant pressure at the film cooling holes. In a vane, or other turbine engine component, having a limited cooling air budget, the resultant pressure drop can reduce the ability to provide internal cooling downstream of the film cooling holes.

Figure 2:
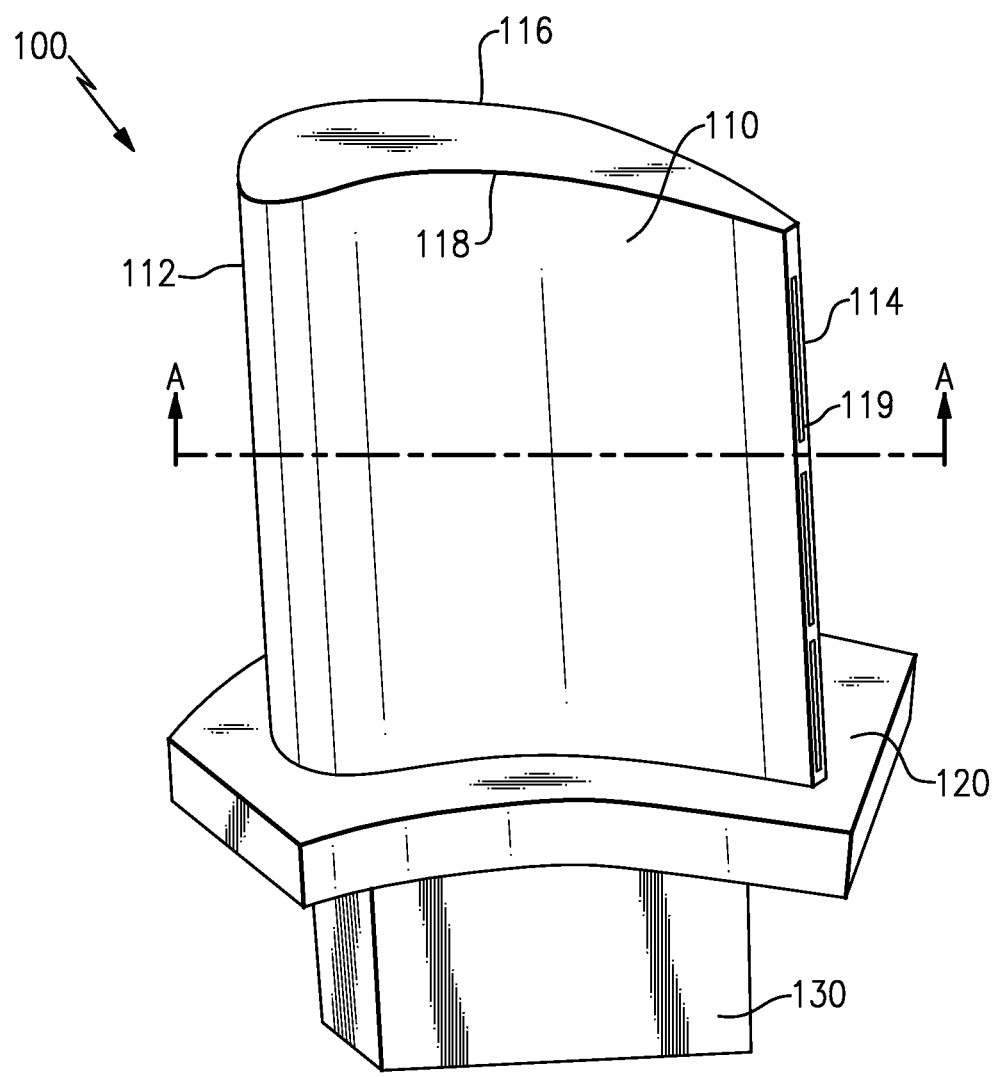
FIG. 2 schematically illustrates a turbine engine component.

With continued reference to FIG. 1, FIG. 2 illustrates an exemplary turbine second stage blade 100. The turbine second stage blade 100 includes a blade portion 110 extending from a platform 120 into the primary flow path of the gas turbine engine 20. A root portion 130 is received in the gas turbine engine static support structure, and maintains the turbine second stage blade 100 in position. The blade portion 110 has a forward edge, referred to as a leading edge 112, and an aft edge, referred to as a trailing edge 114. A cross section A-A of the blade portion 110 drawn from the leading edge 112 to the trailing edge 114 has an airfoil shaped profile (illustrated in FIGS. 3 and 4) with a suction surface 116 and a pressure surface 118 connecting the leading edge 112 to the trailing edge 114.

Included within the blade portion 110 are multiple radially aligned internal cooling passages 210 (illustrated in FIGS. 3 and 4). The radially aligned internal cooling passages 210 form an internal cooling air flow path. Along one surface of the blade portion 110, such as the pressure surface 118, is an axially aligned skin core passage. The axially aligned skin core passage defines an axial flow path, and passes cooling air internally along the surface 118, thereby cooling the surface 118. Cooling air entering the axially aligned skin core passage exits the blade portion 110 through slots 119 in the trailing edge 114. In some example embodiments additional openings connect the axially aligned skin core passage to a radially outward surface of the tip portion 109. In such examples, a small portion of the air passing through the axially aligned skin core passage exits through the openings. The small portion of the air passing through the axially aligned skin core passage that exits through the openings can be less than 20% of the air in some examples, and less than 5% of the air in some examples. In alternative examples, the slots 119 can be replaced with multiple holes, or a single slot extending the full radial height of the axially aligned skin core passage.

In some examples, the blade 100, illustrated in FIG. 2, is created utilizing an investment casting process. In alternative examples, the second stage blade 100 can be created using a process other than investment casting. In either case, the blade 100 is cast around a core defining a negative image of the internal cooling passages of the blade 100. The core is then removed from the component leaving the cooling passages empty of any solid material. A skin core passage, such as the above described skin core passage, is a passage formed around a thin sheet of material that conforms with the shape of the surface along which the skin core passage extends. In the example of FIG. 2, the blade portion 110 is formed around the thin sheet of material, and the thin sheet is removed from the formed blade portion 110 once the second stage blade 100 has been cast. The result is a thin passage that extends along the surface to which the skin core passage is adjacent. Cooling air passing through the skin core passage 220 absorbs heat from the surface via convection, allowing for the surface to be actively cooled.

In some examples, an axially aligned skin core passage, such as is described above, can be utilized in conjunction with a cooling flow that has sufficient cooling air budget for film cooling upstream of the axially aligned skin core, or in a turbine engine component that utilizes multiple cooling air flow paths through the turbine engine component where one of the cooling air flow paths has sufficient budget for film cooling, but the cooling air flow path feeding the axially aligned skin core passage lacks sufficient budget. In such an example, it can be beneficial to provide film cooling from the cooling air flow path, or the upstream portion of the cooling air flow path, where there is sufficient cooling air budget. However, inclusion of the axially aligned skin core passage prevents a direct film cooling hole between the higher pressure feed cavity, 210 and the surface of the turbine engine component, 118.

With continued reference to FIGS. 1 and 2, FIG. 3 illustrates one such turbine engine component 200. The turbine engine component 200 includes a blade portion 210 extending from a platform 220 into the primary flow path of the gas turbine engine 20. A root portion 230 is received in the gas turbine engine static support structure, and maintains the turbine engine component 200 in position. The blade portion 210 has a forward edge, referred to as a leading edge 212, and an aft edge, referred to as a trailing edge 214. A cross section A-A of the blade portion 210 drawn from the leading edge 212 to the trailing edge 214 has an airfoil shaped profile with a suction surface 216 and a pressure surface 218 connecting the leading edge 212 to the trailing edge 214.

Included within the blade portion 210 are multiple radially aligned cooling passages 240. The radially aligned cooling passages 240 form one or more internal cooling air flow paths. Extending along one surface, such as the pressure surface 118, is an axially aligned skin core passage 250. The axially aligned skin core passage 250 defines an axial flow path, and passes the cooing air internally along the corresponding surface 118, thereby cooling the surface 118. Cooling air entering the axially aligned skin core passage 250 exits the blade portion 210 through slots 219 in the trailing edge 214. In alternative examples, the slots 219 can be replaced with multiple holes, or a single slot extending the full radial height of the axially aligned skin core passage 250.

In order to provide film cooling to the surface 218 being cooled by the axially aligned skin core passage 250, film cooling holes 260 are connected to an upstream cooling passage 240 in the cooling flow path through multiple pedestals 262. Each pedestal 262 is a portion of the blade that interrupts (protrudes through) the axially aligned skin core passage 250. In the illustrated example of FIG. 3, each pedestal 262 includes a film cooling hole 260 connecting the surface 218 adjacent to the axially aligned skin core passage 250 to the upstream cooling passage 240. Cooling air is passed from the upstream cooling passage 240 out the film cooling holes 260 and generates a film cooling layer along the aft portion of the blade 200 according to known film cooling principles.

With continued reference to FIG. 3, FIG. 4 illustrates a cross sectional view of the turbine engine component 200 of FIG. 3 drawn along line B-B. In addition to the previously described internal cooling passages 240, one or more radially aligned skin core passages 270 are disposed along the suction side 116 of the blade 200. The radially aligned skin core passages 270 interconnect with one or more of the cooling passages 240 to form sections of the cooling flow path.

As illustrated in the cross sectional view, the pedestals 262 connect internal walls defining the internal flow paths 240 to the exterior surface. In cast rotor blades, such as blades cast around a refractory metal core or a ceramic core, the pedestals are formed utilizing voids in the core element and are an integral structure to the blade 200. Once the blade 200 is cast, film cooling holes 260 are drilled into the pedestal 262 connecting the internal cooling passage 240 to the surface being film cooled.

In the illustrated example of FIG. 4, the internal cooling passages 240 are fed from a single cooling air source, and form a single cooling air flow path. In alternate examples, the cooling air passages 240 can receive air from two or more cooling air sources. In such an example, some of the cooling air passages 240 form a cooling air flow path with sufficient pressure to generate a film cooling flow path, and some of the cooling air passages 240 form a second cooling air flow path at a lower pressure. The axially aligned skin core passage 250 is connected to a cooling passage 240 in the lower pressure cooling air flow path, and the film cooling holes connect the higher pressure cooling air flow path to the film cooled surface 218.

In the illustrated example of FIG. 3, the pedestals 262 have an oblong shape with a longest diameter aligned with a radius of the gas turbine engine including the blade 200. Such a shape/orientation slows down cooling air passing through the axially aligned skin core passage 250.

Figure 5A:
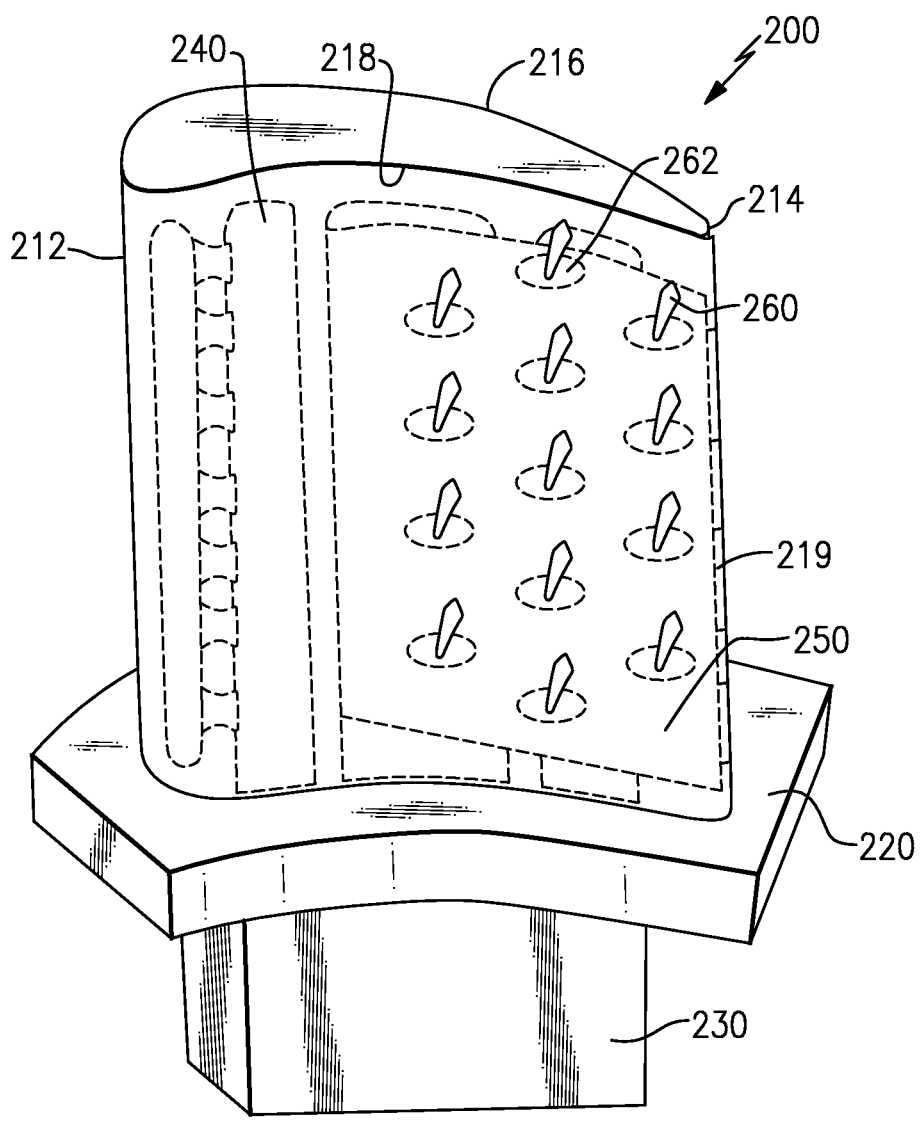
FIG. 5A schematically illustrates a first alternate pedestal cross sectional shape for the second example turbine engine component.
Figure 5C:
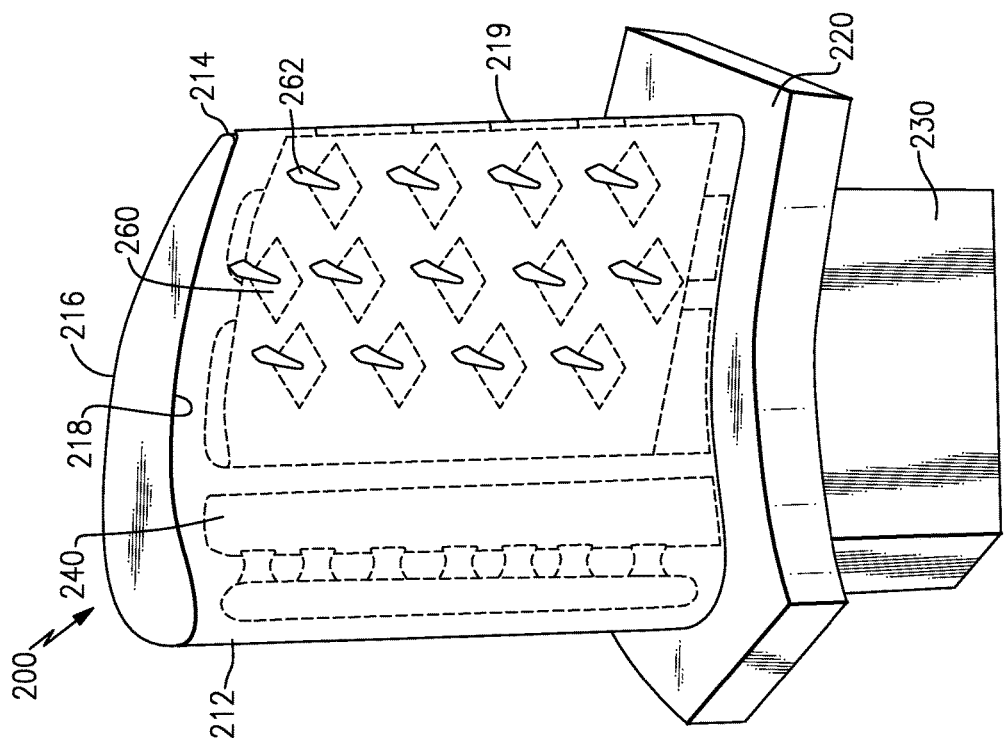
FIG. 5C schematically illustrates a third alternate pedestal cross sectional shape for the second example turbine engine component.
Figure 5B:
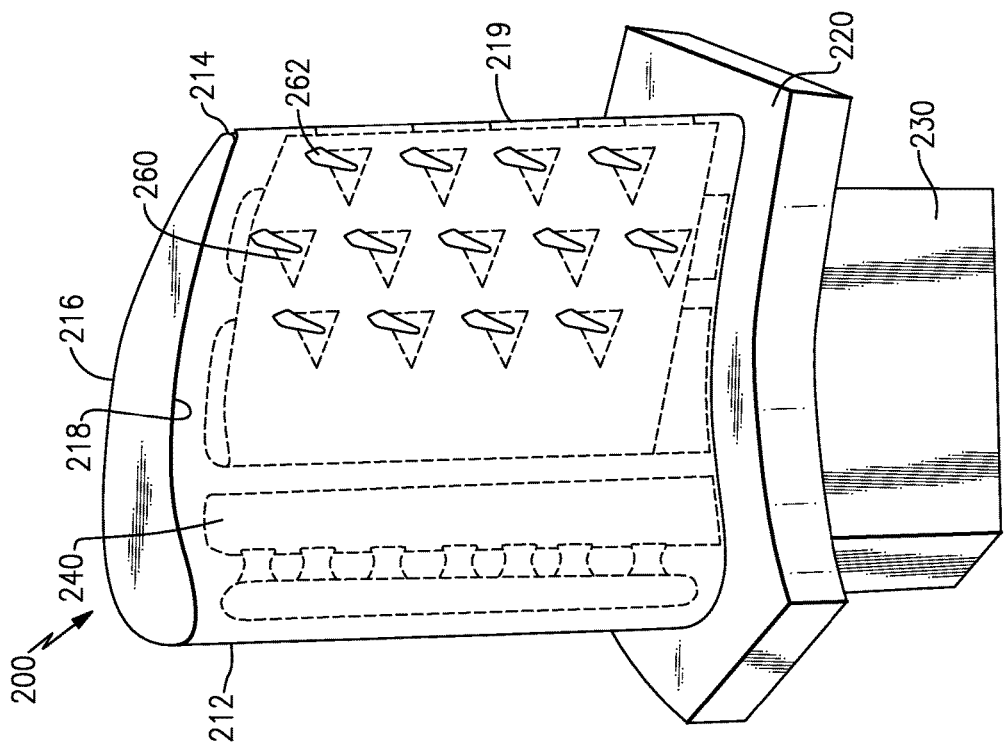
FIG. 5B schematically illustrates a second alternate pedestal cross sectional shape for the second example turbine engine component.

FIGS. 5A-5C illustrate alternative examples of the turbine engine component of FIG. 3 utilizing different shaped pedestals 262. FIG. 5A utilizes oblong oval shaped pedestals 262 with the longer diameter aligned with the axial flow direction of the gas turbine engine including the blade 200. One of skill in the art, having the benefit of this disclosure, will understand that the more the longest diameter of the pedestal 262 is aligned with the axial direction of the gas turbine engine, the less the pedestal 262 will obstruct flow through the skin core passage 250. Further, the optimal angle of the longest diameter, relative to an axis defined by the gas turbine engine can be determined by one of skill in the art, having the benefit of the above disclosure.

Alternative examples, such as those illustrated in FIGS. 5B and 5C can utilize alternative pedestal 260 cross sectional geometries including, but not limited to, triangular shaped pedestals 260 (FIG. 5B), and rhombus shaped pedestals 260 (FIG. 5C). The particular shape and design of the pedestals 260 can be selected by one of skill in the art to account for, and control, cooling air flow through the skin core passage 250, as well as to ensure adequate structural support for the internal walls of the blade 200.

Further, with reference to FIGS. 2-5C, one of skill in the art, having the benefit of this disclosure, will appreciate that the axially aligned skin core passage having an outlet at the aft edge of a gas turbine engine component can be combined with the pedestal film cooling hole arrangement of FIGS. 3-5C to simultaneously achieve the benefits of each feature While described above with regards to blades in general, and a second stage blade in a turbine section of a gas turbine engine in particular, one of skill in the art having the benefit of this disclosure will understand that the above described skin core cooling passage and pedestal arrangement can be applied to any number of actively cooled turbine engine components including, vanes, blades, blade outer air seals, and the like.

Figure 6:
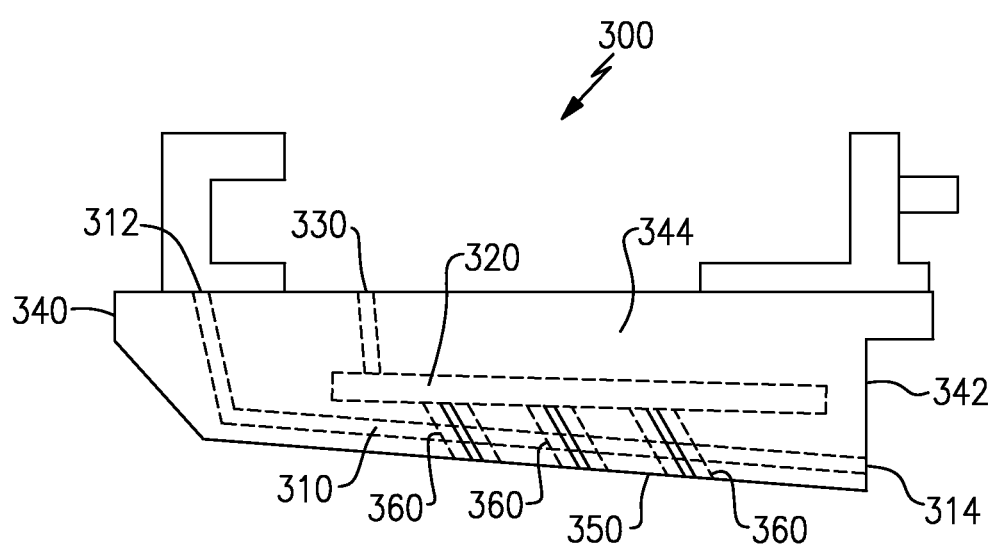
FIG. 6 schematically illustrates an example Blade Outer Air Seal.

By way of example, FIG. 6 illustrates a side view of a Blade Outer Air Seal (BOAS) incorporating an axially aligned skin core cooling passage 310. The BOAS 300 includes at least one internal cooling passage 320 that receives cooling air from a cooling air inlet 330. In the illustrated example, the cooling air inlet 330 is at a radially outward edge of the BOAS 300. In alternative examples, the inlet 330 can be positioned at an fore edge 340, an aft edge 342 or a circumferential edge 344, depending on the design constraints of the BOAS 300.

Also included within the BOAS 300 is an inlet 312 feeding an axial aligned skin core 310. Cooling air passing through the axially aligned skin core 310 exits the skin core 310 at an outlet 314 on the aft edge of the BOAS 300. While the cooling air provided through the skin core 310 is insufficient to provide film cooling, cooling air passing through the at least one internal cooling passage 320 has sufficient pressure. In order to provide film cooling to a radially inward surface 350 of the BOAS 300, pedestals 360 pass through the skin core 310 in the same manner as the pedestals described above with regards to FIGS. 3-5C. Each of the pedestals 360 includes a corresponding film cooling hole 362 connecting the internal cooling passage 320 to the radially inward surface 350, and providing for the film cooling effect.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A turbine engine component comprising:
   a fore edge connected to an aft edge via a first surface and a second surface;
   a plurality of cooling passages defined within the turbine engine component;
   a skin core passage defined within an exterior wall of the turbine engine component and immediately adjacent said first surface; and
   at least one pedestal interrupting a flow path through said skin core passage;
   wherein said at least one pedestal comprises a plurality of pedestals distributed through said skin core passage;
   wherein said at least one pedestal includes a film cooling hole defined at least partially within the at least one pedestal, the film cooling hole connecting one of said plurality of cooling passages to said first surface; and wherein said film cooling hole connects a first cooling air flow path internal to said turbine engine component to said first surface, and wherein said skin core passage receives cooling air from a second cooling air flow path internal to said turbine engine component, and wherein said second cooling air flow path is a low pressure cooling air flow path relative to said first cooling air flow path.

2. The turbine engine component of claim 1, wherein said at least one pedestal has an oblong cross section relative to a radius of a turbine engine including the turbine engine component.

3. The turbine engine of claim 2, wherein each of said oblong cross sections includes a longest diameter, and said longest diameter is aligned with an axis of the turbine engine.

4. The turbine engine of claim 2, wherein each of said oblong cross sections includes a longest diameter, and said longest diameter is aligned with a radius of the turbine engine.

5. The turbine engine of claim 1, wherein each of said pedestals has a cross section along a direction of flow through the skin core passage, the cross section being one of an oval, a triangle, a rhombus, an airfoil, and a circle.

6. The turbine engine of claim 1, wherein at least 80% of the cooling air entering said skin core passage exits said skin core passage at the aft edge.

7. The turbine engine of claim 6, wherein the skin core passage defines an axial coolant flow path.

8. The turbine engine of claim 1, wherein the turbine engine component is one of a blade outer air seal, a combustor liner, a blade, and a vane.

9. The turbine engine component of claim 8, wherein the blade is a blade in a second or later turbine stage.

10. A gas turbine engine comprising:
a compressor section;
a combustor section fluidly connected to the compressor section by a flowpath;
a turbine section fluidly connected to the combustor section by the flowpath;
at least one gas turbine engine component exposed to a fluid passing through said flowpath, the at least one gas turbine engine component including:
a first surface and a second surface;
at least one cooling passage defined within the turbine engine component;
a skin core passage defined within an exterior wall of the at least one gas turbine engine component and immediately adjacent said first surface; and
at least one pedestal interrupting a flow path through said skin core passage, the at least one pedestal connecting an interior surface of said at least one cooling passage to said first surface;
wherein the at least one cooling passage includes a first cooling passage and a second cooling passage, and the at least one pedestal connects the interior surface of the first cooling passage to said first surface; and
wherein the first cooling passage receives a first cooling air from a first source, the second cooling passage receives a second cooling air from a second source, and wherein the skin core passage receives the second cooling air from the second cooling passage.

11. The gas turbine engine of claim 10, further comprising a film cooling hole defined within said at least one pedestal, the film cooling hole providing a flow path between said at least one cooling passage to said first surface.

12. The turbine engine of claim 6, wherein at least 95% of the cooling air entering the skin core passage exits the skin core passage at the aft edge.

13. The turbine engine of claim 1, wherein the skin core passage conforms with a contour of the first surface.

14. The turbine engine of claim 13, wherein each of an inward facing wall and an outward facing wall of the skin core passage conforms with the contour of the first surface.

15. The turbine engine of claim 1, wherein the skin core passage is a convective cooling passage.

* * * * *